United States Patent [19]

Benchoff

[11] Patent Number: 5,067,769
[45] Date of Patent: Nov. 26, 1991

[54] DUCT-WAY BETWEEN A PICKUP TRUCK CAB AND A BED CAP, BOTH WITH SLIDING GLASS WINDOWS

[75] Inventor: John R. Benchoff, P.O. Box 223, Blue Ridge Summit, Pa. 17214-0223

[73] Assignee: John Rex Benchoff, Blue Ridge Summit, Pa.

[21] Appl. No.: 509,606

[22] Filed: Apr. 16, 1990

[51] Int. Cl.$^5$ .............................................. B60P 3/32
[52] U.S. Cl. .................................................. 296/166
[58] Field of Search ...................... 296/166, 155, 190; 49/163

[56] References Cited

U.S. PATENT DOCUMENTS 3,840,266 10/1974 Carlson ................................ 296/166
4,124,054 11/1978 Spretnjak ............................ 296/166
4,294,485 10/1981 Engelhard ........................... 296/166
4,848,832 7/1989 Starnes ................................ 296/166

Primary Examiner—Robert R. Song

[57] ABSTRACT

The invention is a "duct-way" between the pickup truck cab and the bed cap, both with sliding glass windows. The invention is a sealed clear opening which allows the pickup truck sliding glass window to be closed. It is specifically for the sliding glass windows which face each other on a pickup truck cab (rear window) and a bed cap which also has a sliding glass window (front window on the cap).

It is made of clear plastic or plexiglass which allows the driver to use his rear view mirror. The purpose of the duct-way is to allow for heat, air-conditioning, and communication to take place between the cab and cap. This unit is sealed from the weather and is able to be closed from the cab by closing the cab sliding glass window.

1 Claim, 1 Drawing Sheet

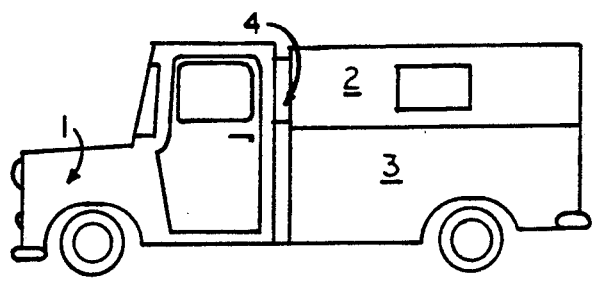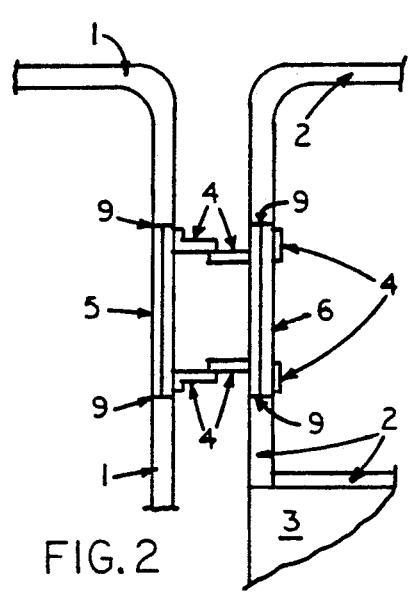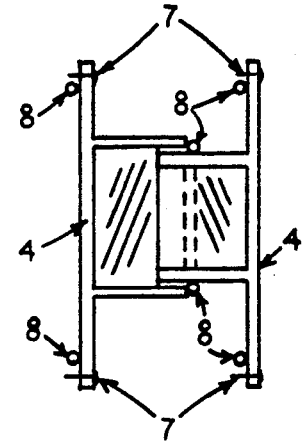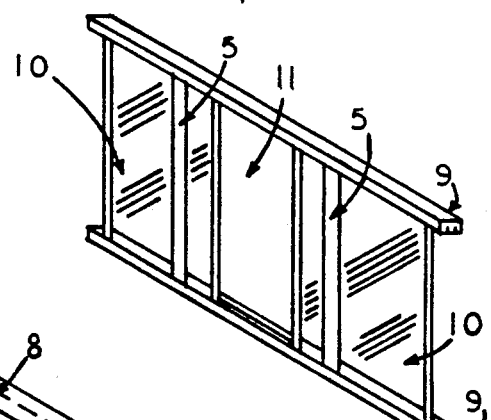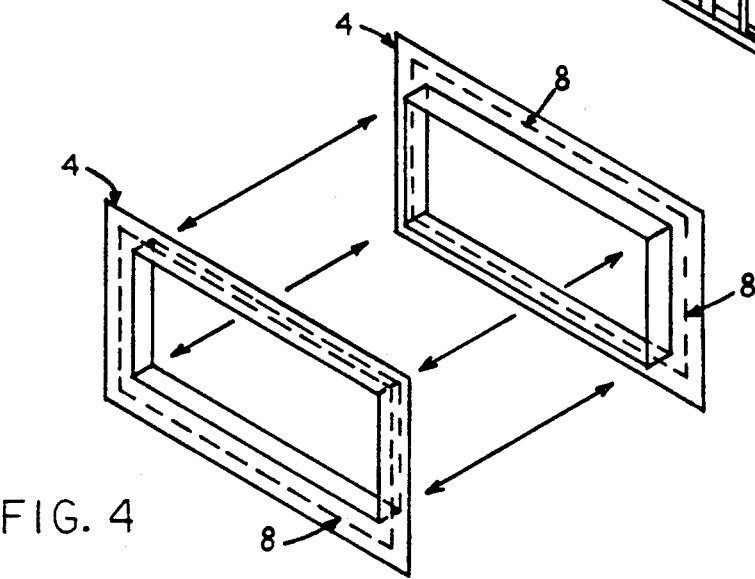

DUCT-WAY BETWEEN A PICKUP TRUCK CAB AND A BED CAP, BOTH WITH SLIDING GLASS WINDOWS

SUMMARY OF THE INVENTION

This invention is an air duct-way opening between a pickup truck cab and a bed cap. It is Specifically for the sliding glass opening of a rearwindow in a pickup cab and a front window (also sliding glass type) of a pickup bed cap.

It is designed to let a permanently sealed opening for heat, air-conditioning and/or communication between these areas.

The unit is made of clear plastic or plexiglass with clear sealant materials to permit vision to the rear from the rear view mirror. It is connected to the cap on the exterior and and screwed on which allows the sliding glass window to open or close at the driver's discretion. It is made of different sizes which will allow for the variety of sliding glass windows on the market.

The duct-way is made in two pieces with theactual duct-way openingtelescoping together and sealing. This gives flexibility for cab and cap movement. It also allows for adjustment on different distances between cab and caps. The cap unit is screwed to the interior of the cap sliding glass window frame and sealed.

This is the first intercommunicating duct-way between sliding glass openings on pickup truck cabs and bed caps. It is also the first unit which is clear for visibility, sealed to exterier weather at the windows and lets the operator open or close the window from the cab.

DESCRIPTION OF THE DRAWINGS

FIG. 1 is a side elevation of a pickup truck with cap on the bed. The ductway is in place between the cab window and cap window.

FIG. 2 is a cross section cutaway of the ductway in connection with the sliding glass windows of the cap and truck cap.

FIG. 3 is also a cross section of the telescoping ductway with the sealant materials together.

FIG. 4 is a isometric view of the separated unit for clarity.

FIG. 5 is a sliding glass window unit with window partly open. This could be a cap window or a pickup cab window.

REFERENCES CITED

| 4848832 | 7-1989 | Starnes | 296/166 |
| 4124054 | 11-1978 | Spretnjak | 296/166 |
| 4294485 | 10-1981 | Engelhard | 296/166 |
| 3840266 | 10-1974 | Carlson | 296/166 |

No Federally sponsored research and development rights.

DETAILED DESCRIPTION OF THE PREFERRED EMBODIMENT

Referring more specifically to the drawings, and FIG. 1 Numeral 3 is the pickup bed, an open topped box, on a conventional automotive vehicle. Number 1 designates the truck including the operator's cab and Numeral 2 designates the camper or cap. The ductway 4 between the rear window of the cab 1 and the front window of the cap 2 is also shown.

In FIG. 2 we have a cutaway of the truck cab 1, cap 2 and the pickup bed 3. Numeral 9 designates the "W" channels for the sliding glass windows connected to the cab 1 and the cap 2. The "W" channels 9 are reinforced with vertical members number 5 for the front sliding glass window and number 6 for the cap sliding glass window. This invention is specifically for two sliding glass windows while the previous window boot and elastic seal were for any window between the cab 1 and cap 2. Also the ductway is of clear material and connects directly to the "W" channel 9 and vertical frame 5 and 6. The ductway 4 is first lined up with the window openings and the front section of the ductway 4 is screwed to the "W" channel 9 of the truck cab 1. After the cap 2 is pulled away from the truck cab 1 it is screwed then to the vertical frame 5 of the sliding glass window, also of the cab side of the ductway unit. This connection will enable the sliding window of the truck cab 1 to be opened and closed when desired with the ductway in place. The front section of the ductway doesn't extend into the open window but connects and extends back away from the open or closed window of the truck cab 1. The cap 2 is then moved forward and reconnected to the bed 3. The cap sliding glass 2 is opened and the back section of the ductway 4 is placed through the opened window and telescoped into the front section of the ductway 4. When the ductway 4 is pushed forward and adjusted to the in-place cap 2 it is screwed to the vertical frame 6 and "W" channel 9 of the cap 2. This invention connects the ductway directly to the window frames 5 and 6 and the "W" channels 9 instead of connectly to the cab 1 and cap 2.

FIG. 3 best shows the telescoping ductway sections 4 fitting together. This cross-section of the unit 4 also shows the clear plastic or silicone seals 8 which seal the telescoping connection in the center. It also shows the seals 8 around the perimeter of the ductway 4. These clear seals will be drawn tight when the screws are drawn together to the "W" channels 9 and vertical frame 5 & 6 in FIG. 2 and FIG. 5.

FIG. 4 is an isometric view depicting the clear ductway 4 pulled apart and the seals 8. here it will follow the arrows together and telescope inward.

FIG. 5 depicts the sliding glass window unit in an isometric view. This would be the cab 1 side. The window glass is only partially open. It defines the open glass where the glass can be opened leading into the ductway (or closed). The ductway material is resilient and flexible and has some flexible play between the connecting telescoping sections. This compensates for the cab and cap movement.

What is claimed:

1. A combination of ductway and sliding windows of a cap (camper)/truck cab, said ductway comprising a telescopically adjustable 2 piece, clear plastic enclosure units for an opening each connected directly to the sliding glass window frames, not depending on the parallel surfaces of the cab/cap, one of said units being screwed to the outside of the cab frame of the sliding glass window with a clear seal to make a weather seal, the other of said units extending through the open sliding glass window of the cap/camper and screwed to the inside of the window frame with sealer also making this side weather sealed, the ductway units interengaging with telescoping surfaces which have a seal, all being of clear see-through plastic or plexiglass.

* * * * *